United States Patent
Ma

(10) Patent No.: US 11,340,497 B2
(45) Date of Patent: May 24, 2022

(54) BACKLIGHT SOURCE, DISPLAY MODULE AND DISPLAY DEVICE

(71) Applicant: BOE TECHNOLOGY GROUP CO., LTD., Beijing (CN)

(72) Inventor: Yongda Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 551 days.

(21) Appl. No.: 16/335,413

(22) PCT Filed: Sep. 26, 2018

(86) PCT No.: PCT/CN2018/107568
§ 371 (c)(1),
(2) Date: Mar. 21, 2019

(87) PCT Pub. No.: WO2019/062749
PCT Pub. Date: Apr. 4, 2019

(65) Prior Publication Data
US 2021/0325733 A1    Oct. 21, 2021

(30) Foreign Application Priority Data
Sep. 30, 2017   (CN) .......................... 201721277205.X

(51) Int. Cl.
*G02F 1/13357* (2006.01)
(52) U.S. Cl.
CPC .. *G02F 1/133608* (2013.01); *G02F 1/133606* (2013.01)
(58) Field of Classification Search
CPC ......... G02F 1/133317; G02F 1/133308; G02F 1/133608; G02F 2201/54
See application file for complete search history.

(56) References Cited

U.S. PATENT DOCUMENTS

2017/0276328 A1*  9/2017  Zhang ................... F21V 17/164

FOREIGN PATENT DOCUMENTS

| CN | 201600530 U | 10/2010 |
|---|---|---|
| CN | 101936485 A | 1/2011 |

(Continued)

OTHER PUBLICATIONS

International Search Report and Written Opinion, English Translation.

(Continued)

*Primary Examiner* — Karabi Guharay
(74) *Attorney, Agent, or Firm* — Brooks Kushman P.C.

(57) ABSTRACT

A backlight source, a display module and a display device are provided. Each set of locational fitting structures in the backlight source includes locational accommodation space formed on one of optical film and support, and locational protrusion formed on the other of optical film and support. A set of locational fitting structures meets at least one of: dimensions of locational accommodation space and corresponding locational protrusion in first direction render relative position between optical film and support completely fixed in first direction, dimension of locational accommodation space in first direction is greater than that of corresponding locational protrusion in first direction, dimensions of locational accommodation space and corresponding locational protrusion in second direction render relative position between optical film and support completely fixed in second direction, or, dimension of locational accommodation space in second direction is greater than that of corresponding locational protrusion in second direction.

20 Claims, 4 Drawing Sheets

(56) References Cited

FOREIGN PATENT DOCUMENTS

| | | | |
|---|---|---|---|
| CN | 207181904 U | 4/2018 | |
| EP | 2804045 A1 | 11/2014 | |
| JP | 2009289597 A | 12/2009 | |
| KR | 20090043900 A | 5/2009 | |
| WO | 2014107908 A1 | 7/2014 | |
| WO | WO-2015037404 A1 * | 3/2015 | ....... G02F 1/133308 |

OTHER PUBLICATIONS

CN207181904U, English Abstract and Machine Translation.
JP2009289597A, English Abstract and Machine Translation.
CN201600530U, English Abstract and Machine Translation.
CN101936485A, English Abstract and Machine Translation.
KR20090043900A, English Abstract and Machine Translation.
WO2014107908A1, English Abstract and Machine Translation.
International Search Report and Written Opinion for Application No. PCT/CN2018/107568, dated Dec. 14, 2018, 10 Pages.

* cited by examiner

BACKLIGHT SOURCE, DISPLAY MODULE AND DISPLAY DEVICE

CROSS-REFERENCE TO RELATED APPLICATIONS

This application is the U.S. national phase of PCT Application No. PCT/CN2018/107568 filed on Sep. 26, 2018, which claims priority to Chinese Patent Application No. 201721277205.X filed on Sep. 30, 2017, which are incorporated herein by reference in their entireties.

TECHNICAL FIELD

The present disclosure relates to the field of display technology, in particular to a backlight source, a display module and a display device.

BACKGROUND

A liquid crystal display (Liquid Crystal Display, LCD) includes a liquid crystal display panel and a backlight source, where the backlight source is used to provide a light source for the liquid crystal display panel so that the LCD can display images.

During use of the liquid crystal display, an optical film in the backlight source is easily subject to relative displacement due to thermal expansion, resulting in sliding of the optical film and thereby leading to poor display quality.

SUMMARY

In a first aspect, a backlight source is provided according to an embodiment of the present disclosure, which includes an optical film, a support and at least two sets of locational fitting structures configured to locate the optical film on the support, where each set of the at least two sets of locational fitting structures includes a locational accommodation space formed on one of the optical film and the support, and a locational protrusion formed on the other of the optical film and the support, and the locational protrusion is inserted in the locational accommodation space.

A set of the at least two sets of locational fitting structures meets at least one of the following: a dimension of the locational accommodation space thereof in a first direction and that of the corresponding locational protrusion in the first direction render a relative position between the optical film and the support completely fixed in the first direction, the dimension of the locational accommodation space in the first direction is greater than that of the corresponding locational protrusion in the first direction, a dimension of the locational accommodation space in a second direction and that of the corresponding locational protrusion in the second direction render the relative position between the optical film and the support completely fixed in the second direction, or, the dimension of the locational accommodation space in the second direction is greater than that of the corresponding locational protrusion in the second direction, where the second direction is perpendicular to the first direction.

In a feasible embodiment according to the present disclosure, the at least two sets of locational fitting structures include a first set of locational fitting structures.

A dimension of the locational accommodation space of the first set of locational fitting structures in the first direction and that of the corresponding locational protrusion of the first set of locational fitting structures in the first direction render the relative position between the optical film and the support completely fixed in the first direction, and a dimension of the locational accommodation space of the first set of locational fitting structures in the second direction and that of the corresponding locational protrusion of the first set of locational fitting structures in the second direction render the relative position between the optical film and the support completely fixed in the second direction.

In a feasible embodiment according to the present disclosure, the at least two sets of locational fitting structures include a second set of locational fitting structures.

A dimension of the locational accommodation space of the second set of locational fitting structures in the first direction is greater than that of the corresponding locational protrusion of the second set of locational fitting structures in the first direction, and a dimension of the locational accommodation space of the second set of locational fitting structures in the second direction is greater than that of the corresponding locational protrusion of the second set of locational fitting structures in the second direction.

In a feasible embodiment according to the present disclosure, the at least two sets of locational fitting structures further include a third set of locational fitting structures and a fourth set of locational fitting structures.

A dimension of the locational accommodation space of the third set of locational fitting structures in the first direction and that of the corresponding locational protrusion of the third set of locational fitting structures in the first direction render the relative position between the optical film and the support completely fixed in the first direction, and a dimension of the locational accommodation space of the third set of locational fitting structures in the second direction is greater than that of the corresponding locational protrusion of the third set of locational fitting structures in the second direction.

A dimension of the locational accommodation space of the fourth set of locational fitting structures in the first direction is greater than that of the corresponding locational protrusion of the fourth set of locational fitting structures in the first direction, and a dimension of the locational accommodation space of the fourth set of locational fitting structures in the second direction and that of the corresponding locational protrusion of the fourth set of locational fitting structures in the second direction render the relative position between the optical film and the support completely fixed in the second direction.

In a feasible embodiment according to the present disclosure, a quantity of the third set of locational fitting structures is at least two, and the at least two third sets of locational fitting structures are arranged near a first edge of the optical film along a length direction of the first edge, where the first edge is perpendicular to the first direction.

In a feasible embodiment according to the present disclosure, the fourth set of locational fitting structures is arranged near a second edge of the optical film, where the second edge is arranged opposite to the first edge.

In a feasible embodiment according to the present disclosure, the fourth set of locational fitting structures is arranged in a marginal region near a middle position of the second edge of the optical film.

In a feasible embodiment according to the present disclosure, the first set of locational fitting structures is arranged in a marginal region near a middle position of the first edge of the optical film.

In a feasible embodiment according to the present disclosure, in a set of the at least two sets of locational fitting structures, a dimension of the locational accommodation space in the second direction is greater than that of the corresponding locational protrusion in the second direction, a distance between the locational protrusion and a first inner wall surface of the locational accommodation space is greater than a distance between the locational protrusion and a second inner wall surface of the locational accommodation space, where a direction from the first inner wall surface to the second inner wall surface is parallel with the second direction, an edge of the optical film corresponding to a light bar is perpendicular to the second direction, and a distance between the first inner wall surface and the edge corresponding to the light bar is smaller than a distance between the second inner wall surface and the edge corresponding to the light bar.

In a feasible embodiment according to the present disclosure, a set of the at least two sets of locational fitting structures is arranged near the second edge of the optical film, a dimension of the locational accommodation space thereof in the first direction is greater than that of the corresponding locational protrusion in the first direction, and a distance between the locational protrusion and a third inner wall surface of the locational accommodation space is greater than a distance between the locational protrusion and a fourth inner wall surface of the locational accommodation space, where a direction from the third inner wall surface to the fourth inner wall surface is parallel with the first direction, and a distance between the third inner wall surface and the second edge of the optical film is greater than a distance between the fourth inner wall surface and the second edge of the optical film.

In a feasible embodiment according to the present disclosure, in a set of the at least two sets of locational fitting structures, a dimension of the locational accommodation space thereof in the second direction is greater than that of the corresponding locational protrusion in the second direction, and the dimension of the locational accommodation space in the second direction is greater than or equal to $a+\Delta L$ and is smaller than or equal to $a+2\Delta L$, where a is the dimension of the locational protrusion in the second direction, and $\Delta L$ is the greater one of thermal expansion amounts of film portions of the optical film at two sides of the corresponding locational fitting structure in the second direction.

In a feasible embodiment according to the present disclosure, in a set of the at least two sets of locational fitting structures, a dimension of the locational accommodation space thereof in the first direction is greater than that of the corresponding locational protrusion in the first direction, and the dimension of the locational accommodation space in the first direction is greater than or equal to $b+\Delta K$ and is smaller than or equal to $b+2\Delta K$, where b is the dimension of the locational protrusion in the first direction, and $\Delta K$ is the greater one of thermal expansion amounts of film portions of the optical film at two sides of the corresponding locational fitting structure in the first direction.

In a feasible embodiment according to the present disclosure, each set of the at least two sets of locational fitting structures includes the locational accommodation space formed on the optical film and the locational protrusion formed on the support.

In a feasible embodiment according to the present disclosure, the support is a plastic frame.

In a second aspect, a display module is further provided according to the present disclosure, which includes the backlight source as described above.

In a third aspect, a display device is further provided according to the present disclosure, which includes the display module as described above.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

Figure 1:
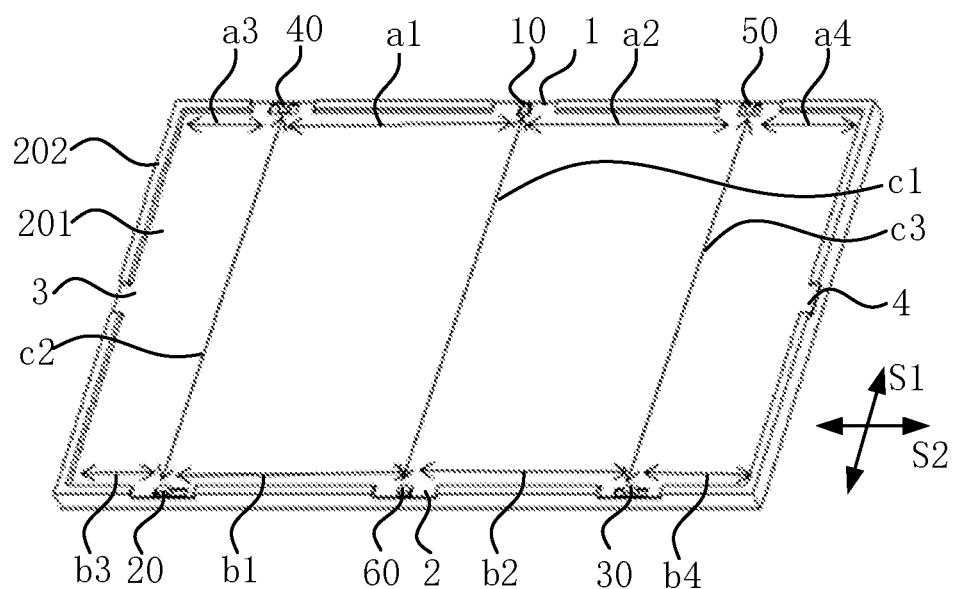
FIG. 1 is an overall schematic structural diagram of a part of a backlight source according to some embodiments of the present disclosure.

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

A backlight source mainly includes a backplane, a frame, a plastic frame, an optical film, a light guide plate and a light-emitting diode (Light-emitting diode, abbreviated as LED) light bar, and further includes locational posts for locating the optical film. Locational holes are provided in the optical film, and the optical film is mounted and located in the backlight source by the locational holes and the locational posts cooperated with each other, where the locational posts are generally arranged on the plastic frame.

As the optical film expands due to heat generated during operating of the backlight source, reservation of a thermal expansion allowance for the optical film is taken into consideration in dimension designing of the locational holes and the locational posts, to avoid wrinkling of the optical film at locations of the locational posts. Just because of the reserved allowance between the dimensions of the locational holes and the locational posts, the film may slide due to relative displacement, resulting in poor display quality.

Therefore, how to address the issues of thermal expansion of the optical film and the sliding of the optical film due to the relative displacement is a problem to be solved in locational designing of the optical film.

A backlight source, a display module and a display device are provided according to the embodiments of the present disclosure, which address the issue of thermal expansion of the optical film and the issue of sliding of the optical film due to the relative displacement, for locating of the optical film.

A backlight source is provided according to the embodiments of the present disclosure, which includes an optical film, a support and at least two sets of locational fitting structures configured to locate the optical film on the support. Each set of locational fitting structures includes a locational accommodation space formed on one of the optical film and the support, and a locational protrusion formed on the other of the optical film and the support, where the locational protrusion is inserted in the locational accommodation space.

A set of the at least two sets of locational fitting structures meets at least one of the following: a dimension of a locational accommodation space thereof in a first direction and that of a corresponding locational protrusion in the first direction render a relative position between the optical film and the support completely fixed in the first direction, the dimension of the locational accommodation space in the first direction is greater than that of the corresponding locational protrusion in the first direction, a dimension of the locational accommodation space in a second direction and that of the corresponding locational protrusion in the second direction render the relative position between the optical film and the support completely fixed in the second direction, or, the dimension of the locational accommodation space in the second direction is greater than that of the corresponding locational protrusion in the second direction, where the second direction is perpendicular to the first direction.

For example, the dimension of the locational accommodation space in the first direction may be set to be equal to that of the corresponding locational protrusion in the first direction, to achieve matching of the dimensions of the locational accommodation space and the corresponding locational protrusion in the first direction, that is, the dimension of the locational accommodation space in the first direction and that of the corresponding locational protrusion in the first direction render a relative position between the optical film and the support completely fixed in the first direction; and the dimension of the locational accommodation space in the second direction may be set to be equal to that of the corresponding locational protrusion in the second direction, to achieve matching of the dimensions of the locational accommodation space and the corresponding locational protrusion in the second direction, that is, the dimension of the locational accommodation space in the second direction and that of the corresponding locational protrusion in the second direction render the relative position between the optical film and the support completely fixed in the second direction.

It should be noted that the dimensions referred to in the embodiments of the present disclosure are basic dimensions. For example, in the case that the dimension of the locational accommodation space in the first direction is equal to that of the corresponding locational protrusion in the first direction, it is understandable that a basic dimension of the locational accommodation space in the first direction is equal to a basic dimension of the corresponding locational protrusion in the first direction; and for mounting requirements, an assembly tolerance may be included on the basis of the basic dimension of the locational accommodation space in the first direction and/or the basic dimension of the corresponding locational protrusion in the first direction.

The backlight source according to the embodiments of the present disclosure includes a set of locational fitting structures in which a dimension of a locational accommodation space thereof in the first direction and that of a corresponding locational protrusion in the first direction render a relative position between the optical film and the support completely fixed in the first direction, and a set of locational fitting structures in which a dimension of a locational accommodation space thereof in the second direction and that of a corresponding locational protrusion in the second direction render a relative position between the optical film and the support completely fixed in the second direction, which achieves locating of the optical film in the first direction and the second direction and avoids displacement of the optical film in the two perpendicular directions.

In addition, a set of locational fitting structures in which a dimension of a locational accommodation space thereof in the first direction is greater than that of a corresponding locational protrusion in the first direction, and a set of locational fitting structures in which a dimension of a locational accommodation space thereof in the second direction is greater than that of a corresponding locational protrusion in second direction are provided, which allows for thermal expansion in the first direction and the second direction respectively.

Therefore, the backlight source according to the embodiments of the present disclosure can solve both the problem of thermal expansion of the optical film and the problem of sliding of the optical film due to relative displacement.

FIG. 1 is a schematic structural diagram of part of a backlight source according to an embodiment of the present disclosure. With reference to FIG. 1, in an embodiment of the present disclosure, the backlight source includes an optical film 201 and a support, where the support is configured to support the optical film 201. In some embodiments, the support may be a plastic frame, and the plastic frame 202 is arranged surrounding the optical film 201. A first locational structure is provided on the optical film 201, and a second locational structure cooperated with the first locational structure is provided on the plastic frame 202. When assembling the optical film 201 with the plastic frame 202, the optical film 201 is located by interconnecting of the first locational structure and the second locational structure.

In one or more embodiments of the present disclosure, a set of locational fitting structures is formed by the first locational structure of the optical film 201 and the second locational structure of the plastic frame 202 cooperated with each other. The backlight source may, for example, include at least two sets of locational fitting structures. In an embodiment of the present disclosure, a locational accommodation space is provided on one of the first and the second locational structures, and the other of the first and the second locational structures is formed as a locational protrusion, where locating of the optical film 201 is achieved by inserting the protrusion in the locational accommodation space.

Therefore, each set of the at least two sets of locational fitting structures in the backlight source includes a locational accommodation space formed on one of the optical film 201 and the plastic frame 202, and a locational protrusion formed on the other of the optical film 201 and the plastic frame 202.

In some embodiments of the present disclosure, the locational accommodation space is provided on the optical film 201, and the locational protrusion is provided on the plastic frame 202. Additionally, with reference to FIG. 1, the locational accommodation space provided on the optical film 201 is formed as a mounting hole, and the locational protrusion on the plastic frame 202 is formed as a post which can penetrate the mounting hole on the optical film 201.

It is understandable that the locational fitting structures provided on the optical film 201 and the plastic frame 202 for locating of the optical film 201 are not limited to the above-described manner. For example, the locational accommodation space on the optical film 201 may also be a slotting with an accommodation space, as long as it can be aligned and connected with the locational protrusion on the plastic frame 202 by way of insertion.

The specific structure of the backlight source according to the embodiments of the present disclosure is described in detail with reference to the locational fitting structures on the optical film 201 and the plastic frame 202 as shown in FIG. 1.

Figure 2:
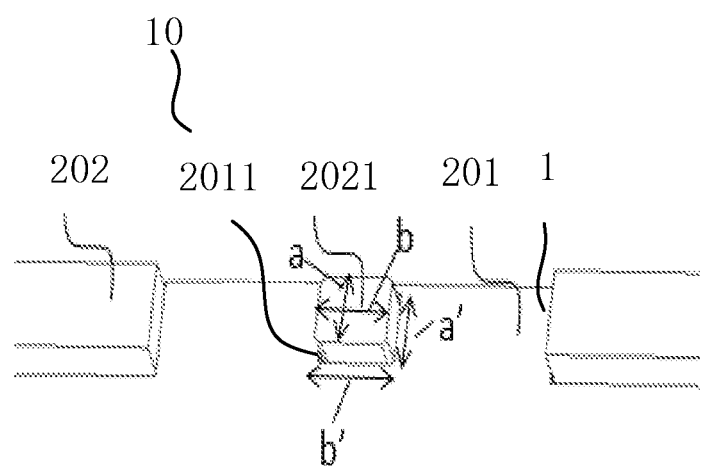
FIG. 2 is a schematic diagram of a first set of locational fitting structures according to some embodiments of the present disclosure.

With reference to FIG. 1, a first set of locational fitting structures is provided between the optical film 201 and the plastic frame 202, which may, for example, include a fifth locational fitting structure 10 shown in FIGS. 1 and 2. In the first set of locational fitting structures, a locational accommodation space 2011 is provided on the optical film 201, and a locational protrusion 2021 is provided on the plastic frame 202, as is shown in FIG. 2. A dimension a' of the locational accommodation space 2011 in a first direction and a dimension a of the locational protrusion 2021 in the first direction render a relative position between the optical film and the support completely fixed in the first direction. A dimension b' of the locational accommodation space 2011 in a second direction and a dimension b of the locational protrusion 2021 in the second direction render the relative position between the optical film and the support completely fixed in the second direction.

In some embodiments of the present disclosure, the first and the second directions are respectively parallel with two adjacent edges of the optical film 201. It is understandable that the first direction is generally perpendicular to the second direction. The structure of the backlight source according to the present disclosure is detailed on the basis of the first direction being a vertical direction of the optical film (the direction indicated by the arrow S1 in the drawing) and the second direction being a horizontal direction of the optical film (the direction indicated by the arrow S2 in the drawing). In addition, the fact that the two dimensions render a relative position between the optical film and the support completely fixed in the first direction and/or the second direction referred to in the present disclosure is defined as: the dimensions of the locational protrusion 2021 and the locational accommodation space 2011 in the corresponding direction meet the need of a general assembly tolerance, that is, no thermal expansion allowance is reserved between the locational protrusion 2021 and the locational accommodation space 2011.

Figure 3:
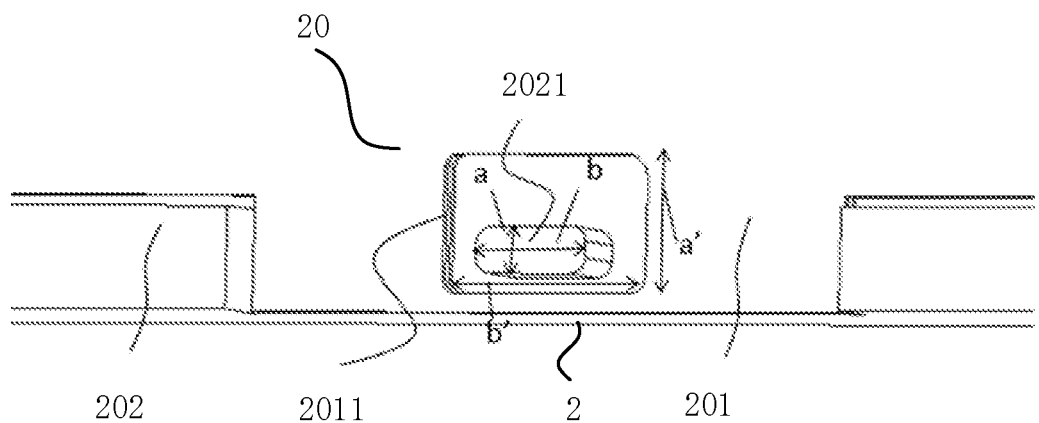
FIG. 3 is a schematic diagram of a second set of locational fitting structures according to some embodiments of the present disclosure.
Figure 4:
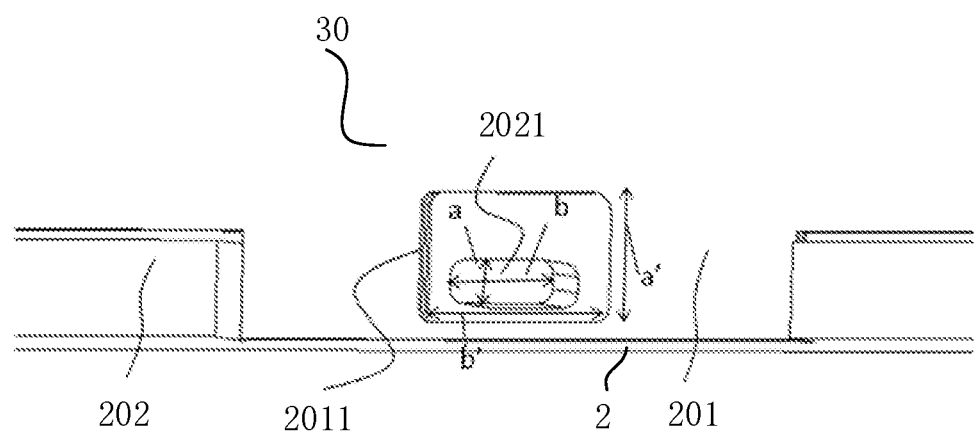
FIG. 4 is a schematic diagram of a second set of locational fitting structures according to some embodiments of the present disclosure.

In some embodiments of the present disclosure, a second set of locational fitting structures is further provided between the optical film 201 and the plastic frame 202, which may, for example, include a first locational fitting structure 20 and a second locational fitting structure 30 as shown in FIGS. 1, 3 and 4.

With reference to FIGS. 3 and 4, in the second set of locational fitting structures, a dimension a' of a locational accommodation space 2011 thereof in the first direction is greater than a dimension a of a corresponding locational protrusion 2021 in the first direction; and a dimension b' of the locational accommodation space 2011 in the second direction is greater than a dimension b of the corresponding locational protrusion 2021 in the second direction.

Figure 5:
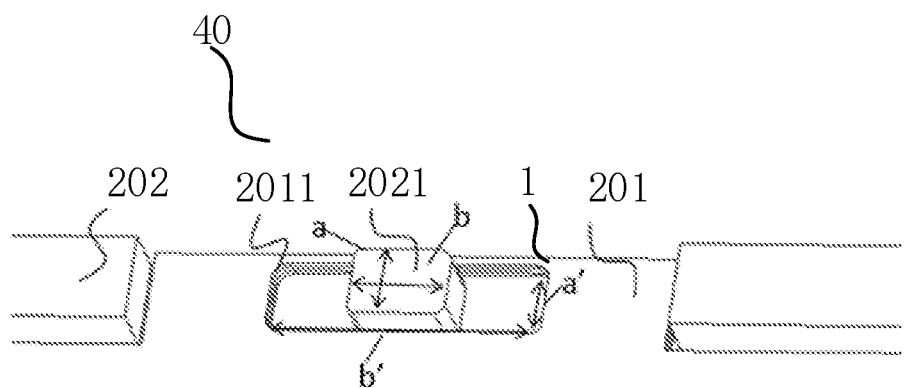
FIG. 5 is a schematic diagram of a third set of locational fitting structures according to some embodiments of the present disclosure.
Figure 6:
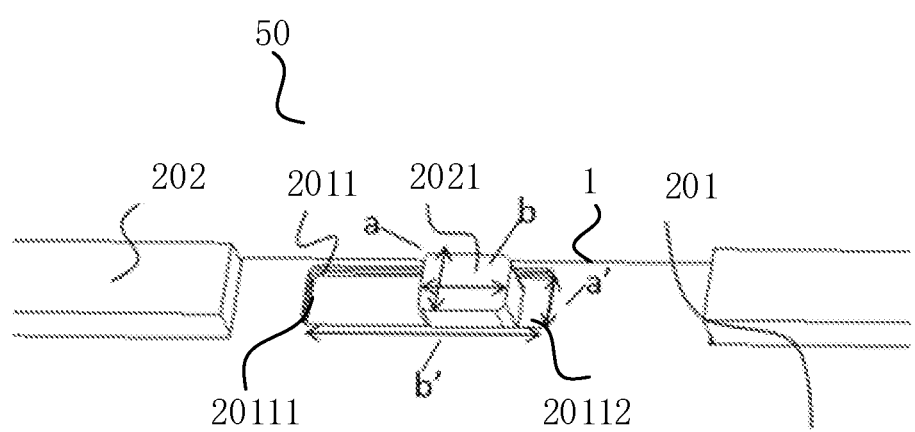
FIG. 6 is a schematic diagram of a third set of locational fitting structures according to some embodiments of the present disclosure.

In some embodiments of the present disclosure, a third set of locational fitting structures may be further formed between the optical film 201 and the plastic frame 202, which may, for example, include a third locational fitting structure 40 and a fourth locational fitting structure 50 as shown in FIGS. 1, 5 and 6.

With reference to FIGS. 5 and 6, in the third set of locational fitting structures, a dimension a' of a locational accommodation space 2011 thereof in the first direction and a dimension a of a corresponding locational protrusion 2021 in the first direction render the relative position between the optical film and the support completely fixed in the first direction; and a dimension b' of the locational accommodation space 2011 in the second direction is greater than a dimension b of the corresponding locational protrusion 2021 in the second direction.

Figure 7:
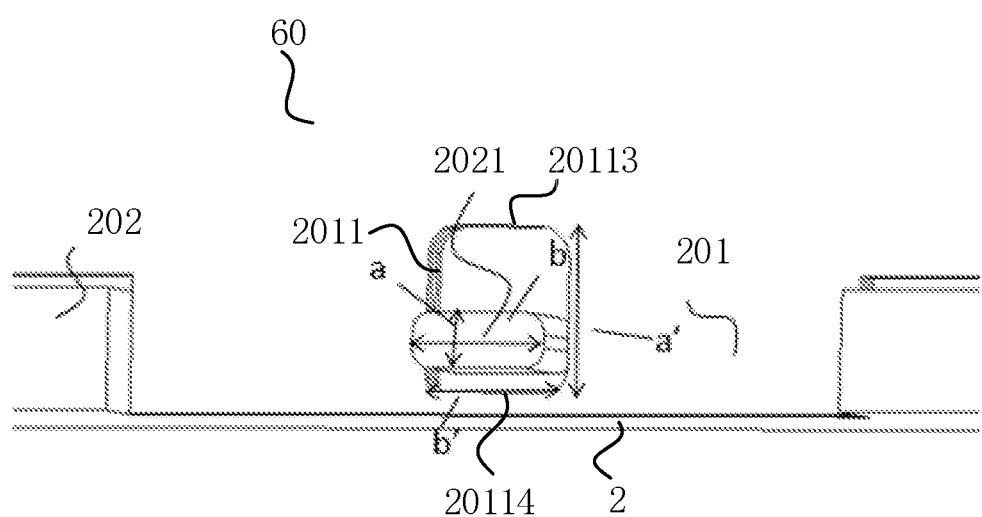
FIG. 7 is a schematic diagram of a fourth set of locational fitting structures according to some embodiments of the present disclosure.

In addition, as shown in FIG. 1, a fourth set of locational fitting structures is further formed between the optical film 201 and the plastic frame 202, which may, for example, include a sixth locational fitting structure 60 as shown in FIGS. 1 and 7.

With reference to FIG. 7, in the fourth set of locational fitting structures, a dimension a' of a locational accommodation space 2011 thereof in the first direction is greater than a dimension a of a corresponding locational protrusion 2021 in the first direction; and a dimension b' of the locational accommodation space 2011 in the second direction and a dimension b of the corresponding locational protrusion 2021 in the second direction render the relative position between the optical film and the support completely fixed in the second direction.

In the backlight source according to one or more embodiments of the present disclosure, a thermal expansion allowance in the second direction is reserved for the optical film by providing the second and the third sets of locational fitting structures; a thermal expansion allowance in the first direction is reserved for the optical film by providing the second and the fourth sets of locational fitting structures; locating of the optical film is achieved in the first direction by providing the first and the third sets of locational fitting structures, avoiding sliding of the optical film in the first direction due to displacement; and locating of the optical film is achieved in the second direction by providing the first and the fourth sets of locational fitting structures, avoiding sliding of the optical film in the second direction due to displacement. Therefore, the backlight source according to the embodiments of the present disclosure not only solves the problem of thermal expansion of the optical film, but also solves the problem of sliding of the optical film due to displacement.

The quantity of locational fit structures in each set of locational fitting structures formed between the optical film 201 and the plastic frame 202 in the backlight source shown in FIG. 1 may be, for example, one or two. It is understandable that the quantity is not limited in the present disclosure, and the quantity of each set of locational fitting structures may be one or at least two, which may be determined based on practical locating requirements of the optical film.

In addition, the third locational fitting structure 40 and the fourth locational fitting structure 50 as shown in FIG. 1 are formed as the third set of locational fitting structures. In some embodiments of the present disclosure, the third locational fitting structure 40 and the fourth locational fitting structure 50 are arranged near a first edge 1 along a length direction of the first edge 1, where the first edge 1 is perpendicular to the first direction. In some embodiments of the present disclosure, the first edge 1 may be horizontally arranged.

In some embodiments of the present disclosure, the fifth locational fitting structure 10 may be arranged in a marginal region near the middle of the first edge 1 of the optical film 201. Specifically, the fifth locational fitting structure 10 may be arranged between the third locational fitting structure 40 and the fourth locational fitting structure 50. The fifth locational fitting structure 10, the third locational fitting structure 40 and the fourth locational fitting structure 50 are aligned along a straight line and parallel with a center line in a direction of the first edge 1.

With reference to FIG. 1, the sixth locational fitting structure 60 is correspondingly arranged near a second edge 2 of the optical film 201, where the second edge 2 is arranged opposite to the first edge 1. The sixth locational fitting structure 60 may be arranged in a marginal region near the middle of the second edge 2 of the optical film 201.

In addition, the first locational fitting structure 20 and the second locational fitting structure 30 are arranged near the second edge 2 along a length direction of the second edge 2, and the sixth locational fitting structure 60 is arranged between the first locational fitting structure 20 and the second locational fitting structure 30. The sixth locational fitting structure 60, the first locational fitting structure 20 and the second locational fitting structure 30 are aligned along a straight line and parallel to a center line in a direction of the second edge 2.

With reference to FIG. 1, the fifth locational fitting structure 10 and the sixth locational fitting structure 60 are aligned along a straight line and perpendicular to the center line in the direction of the second edge 2; the first locational fitting structure 20 and the third locational fitting structure 40 are aligned along a straight line and perpendicular to the center line in the direction of the second edge 2; and the second locational fitting structure 30 and the fourth locational fitting structure 50 are aligned along a straight line and perpendicular to the center line in the direction of the second edge 2.

With the above described arrangement, the fifth locational fitting structure 10, the third locational fitting structure 40 and the fourth locational fitting structure 50 are aligned along a straight line and parallel with the center line in the direction of the first edge 1, which effectively achieves locating of the optical film in the first direction and reserves a thermal expansion allowance in the second direction for the optical film 201. The first locational fitting structure 20 and the second locational fitting structure 30 are aligned along a straight line and parallel with the center line in the direction of the second edge 2, which effectively achieves locating of the optical film in the second direction and reserves a thermal expansion allowance in the second direction for the optical film 201. The fifth locational fitting structure 10 and the sixth locational fitting structure 60 are aligned along a straight line and perpendicular to the center line in the direction of the second edge 2, which ensures locating of the middle region of the optical film 201 and reserves thermal expansion allowances in the first and the second directions.

In a set of the four sets of locational fitting structures, a dimension of a locational accommodation space thereof in the second direction is greater than that of a corresponding locational protrusion in the second direction, a distance between the locational protrusion and a first inner wall surface of the locational accommodation space is greater than a distance between the locational protrusion and a second inner wall surface of the locational accommodation space, where a direction from the first inner wall surface to the second inner wall surface is parallel with the second direction, an edge of the optical film corresponding to a light bar is perpendicular to the second direction, and a distance between the first inner wall surface and the edge corresponding to the light bar is greater than a distance between the second inner wall surface and the edge corresponding to the light bar.

Exemplary description is provided with reference to FIGS. 1 and 6 hereinafter. The backlight source according to some embodiments of the present disclosure may be a unilateral light source, and a third edge 3 of the optical film 201 may be the edge corresponding to the light bar. That is, a light bar of the backlight source is arranged beneath the optical film 201 at a side of the edge corresponding to the light bar and parallel with the edge corresponding to the light bar. With reference to FIG. 6, in the fourth locational fitting structure 50, a dimension b' of a locational accommodation space 2011 thereof in the second direction is greater than a dimension b of a corresponding locational protrusion 2021 in the second direction, and a distance between the locational protrusion 2021 and a first inner wall surface 20111 of the locational accommodation space 2011 is greater than a distance between the locational protrusion 2021 and a second inner wall surface 20112 of the locational accommodation space 2011, where a direction from the first inner wall surface 20111 to the second inner wall surface 20112 is parallel to the second direction (that is, the horizontal direction), and a distance between the first inner wall surface 20111 and the edge corresponding to the light bar (that is, the third edge 3) is smaller than a distance between the second inner wall surface 20112 and the edge corresponding to the light bar.

As the first inner wall surface 20111 is closer to the third edge 3 than the second inner wall surface 20112, a part of the optical film 201 closer to the third edge 3 is subjected to a greater thermal expansion during operating of the module. Hence, a greater thermal expansion amount needs to be reserved for the part closer to the third edge 3. In this way, designing of the locational structures for locating the optical film in the backlight source according to some embodiments of the present disclosure is rendered more reasonable.

Similarly, other sets of locational fitting structures in which a dimension of a locational accommodation space thereof in the second direction is greater than that of a corresponding locational protrusion in the second direction may also be configured as described above, which is not described in detail herein.

In addition, a set of the four sets of locational fitting structures is arranged near the second edge of the optical film, a dimension of a locational accommodation space thereof in the first direction is greater than that of a corresponding locational protrusion in the first direction, and a distance between the locational protrusion and a third inner wall surface of the locational accommodation space is greater than a distance between the locational protrusion and a fourth inner wall surface of the locational accommodation space, where a direction from the third inner wall surface to the fourth inner wall surface is parallel with the first direction, and a distance between the third inner wall surface and the second edge of the optical film is greater than a distance between the fourth inner wall surface and the second edge of the optical film.

Exemplary description is provided with reference to FIGS. 1 and 7 hereinafter. The sixth locational fitting structure 60 is arranged near the second edge 2 of the optical film

201, and a dimension a' of a locational accommodation space 2011 thereof in the first direction is greater than a dimension a of a corresponding locational protrusion 2021 in the first direction. A distance between the locational protrusion 2021 and a third inner wall surface 20113 of the locational accommodation space 2011 is greater than a distance between the locational protrusion 2021 and a fourth inner wall surface 20114 of the locational accommodation space 2011, a direction from the third inner wall surface 20113 to the fourth inner wall surface 20114 is parallel with the first direction (that is, the vertical direction), and a distance between the third inner wall surface 20113 and the second edge 2 of the optical film 201 is greater than a distance between the fourth inner wall surface 20114 and the second edge 2 of the optical film 201.

In some embodiments of the present disclosure, the fourth inner wall surface 20114 is closer to the second edge of the optical film 201 than the third inner wall surface 20113. As a part of the optical film 201 closer to the third inner wall surface 20113 is subjected to a greater thermal expansion during operating of the module, a greater thermal expansion amount needs to be reserved for the part closer to the third inner wall surface 20113. In this way, designing of the locational structures for locating the optical film in the backlight source according to some embodiments of the present disclosure is rendered more reasonable.

Similarly, other sets of locational fitting structures in which a dimension of a locational accommodation space thereof in the first direction is greater than that of a corresponding locational protrusion in the first direction may also be configured as described above, which is not described in detail herein.

In the backlight source according to some embodiments of the present disclosure in another aspect, in a set of locational fitting structures, a dimension of a locational accommodation space thereof in the second direction is greater than that of a corresponding locational protrusion in the second direction, the dimension of the locational accommodation space in the second direction is greater than or equal to $a+\Delta L$ and is smaller than or equal to $a+2\Delta L$, where a is the dimension of the locational protrusion in the second direction, and $\Delta L$ is the greater one of thermal expansion amounts of film portions of the optical film at two sides of a corresponding locational fitting structure in the second direction.

Thermal expansion amounts of the optical film for calculating the dimensions of the locational accommodation spaces are precisely determined based on configurations of different sets of locational fitting structures as described above.

In some embodiments of the present disclosure, with reference to FIGS. 1 and 5, in the third locational fitting structure 40 as shown in FIG. 1, a dimension b' of a locational accommodation space 2011 thereof in the second direction is greater than a dimension b of a corresponding protrusion 2021 in the second direction. In a case that distance between a center line of the third locational fitting structure 40 in the first direction and the third edge 3 of the optical film 201 is a3, a distance between the center line of the third locational fitting structure 40 in the first direction and a center line of the fifth locational fitting structure 10 in the first direction is a1, and a1 is greater than a3, the dimension b' of the locational accommodation space 2011 in the second direction is greater than or equal to $a+\Delta L$ and is smaller than or equal to $a+2\Delta L$, where a is the dimension of the locational protrusion in the second direction, and $\Delta L$ is a thermal expansion amount of a part of the optical film with a dimension of a1.

In addition, $\Delta L = \beta \times L \times \Delta T$, where $\beta$ is a thermal expansion coefficient of the optical film, L is a dimension value of a1 and $\Delta L$ is a temperature change of the optical film.

Similarly, in other sets of locational fitting structures, a thermal expansion amount is reserved for the locational accommodation space 2011 in a corresponding direction and a dimension of the locational accommodation space in the corresponding direction is determined, based on positions of locational fitting structures at two sides in the corresponding direction. In a case that an edge of the optical film is arranged at one side of a locational fitting structure and another locational fitting structure is arranged at the other side of the location fitting structure, the thermal expansion amount of the optical film in the corresponding direction is determined based on the greater one of distances between the locational fitting structure and the edge of the optical film and between the locational fitting structure and the another locational fitting structure at the other side; and in a case that locational fitting structures are provided at both sides of the locational fitting structure, the thermal expansion amount of the optical film in the corresponding direction is determined based on a distance between the locational fitting structure and a locational fitting structure farther away from the locational fitting structure.

Similarly, in the first direction, in a set of locational fitting structures, a dimension of a locational accommodation space thereof in the first direction is greater than that of a corresponding locational protrusion in the first direction, the dimension of the locational accommodation space in the first direction is greater than or equal to $b+\Delta K$ and is smaller than or equal to $b+2\Delta K$, where b is the dimension of the locational protrusion in the first direction, and $\Delta K$ is the greater one of thermal expansion amounts of film portions of the optical film at two sides of a corresponding locational fitting structure in the first direction. $\Delta K$ is determined in the same way as $\Delta L$, which is not described in detail herein.

In some embodiments of the present disclosure, as shown in FIG. 1, along the first direction, a distance c2 between the first locational fitting structure 20 and the third locational fitting structure 40, a distance c1 between the fifth locational fitting structure 10 and the sixth locational fitting structure 60 and a distance c3 between the second locational fitting structure 30 and the fourth locational fitting structure 50 are the same.

In addition, along the second direction, a distance b3 between the first locational fitting structure 20 and the third edge 3 is equal to a distance a3 between the third locational fitting structure 40 and the third edge 3, a distance a1 between the fifth locational fitting structure 10 and the locational fitting structure 40 is equal to a distance b1 between the sixth locational fitting structure 60 and the first locational fitting structure 20, a distance a2 between the fifth locational fitting structure 10 and the fourth locational fitting structure 50 is equal to a distance b2 between the sixth locational fitting structure 60 and the second locational fitting structure 30, and a distance a4 between the fourth locational fitting structure 50 and a fourth edge 4 of the optical film 201 is equal to a distance b4 between the second locational fitting structure 30 and the fourth edge 4.

In the backlight source according to the embodiments of the present disclosure, designing of the locational structures for locating the optical film is rendered more reasonable with the above-described arrangements, which not only solves the problem of thermal expansion of the optical film, but also solves the problem of sliding of the optical film due to displacement.

A display module is further provided according to an embodiment of the present disclosure, which includes the backlight source as described above. It is understandable that the display module further includes a display panel.

A display device is further provided according to an embodiment of the present disclosure, which includes the display module as described above. The display device may be a cellphone, a tablet computer, a laptop computer, an ultra-mobile personal computer (Ultra-Mobile Personal Computer, UMPC), a netbook or a personal digital assistant (Personal Digital Assistant, PDA).

The multiple sets of locational fitting structures in the backlight source according to the embodiments of the present disclosure include a set of locational fitting structures in which a dimension of a locational accommodation space thereof in the first direction and that of a corresponding locational protrusion in the first direction render the relative position between the optical film and the support completely fixed in the first direction, and a set of locational fitting structures in which a dimension of a locational accommodation space thereof in the second direction and that of a corresponding locational protrusion in the second direction render the relative position between the optical film and the support completely fixed in the second direction, which achieves locating of the optical film in the first and the second directions and avoids displacement of the optical film in the two perpendicular directions.

In addition, a set of locational fitting structures in which a dimension of a locational accommodation space thereof in the first direction is greater than that of a corresponding locational protrusion in the first direction, and a set of locational fitting structures in which a dimension of a locational accommodation space thereof in the second direction is greater than that of a corresponding locational protrusion in the second direction are provided, which allows for thermal expansion in the first and the second directions respectively.

Therefore, the backlight source according to the embodiments of the present disclosure can solve the problem of thermal expansion of the optical film and solve the problem of sliding of the optical film due to relative displacement.

The specific structure of the display module including the backlight source according to the embodiments of the disclosure is clear to those skilled in the art in view of the detailed descriptions set forth above, which is described in detail herein.

Optional embodiments of the present disclosure are described hereinabove. It should be noted that a person skill in the art can make various improvements and polishments without departing from the principles of the present disclosure, and these improvements and polishments shall fall within the protection scope of the present disclosure.

What is claimed is:

1. A backlight source, comprising an optical film, a support, and at least two sets of locational fitting structures configured to locate the optical film on the support, wherein each set of the at least two sets of locational fitting structures comprises a locational accommodation space formed on one of the optical film and the support, and a locational protrusion formed on the other of the optical film and the support, and wherein the locational protrusion is inserted in the locational accommodation space;

wherein, a set of the at least two sets of locational fitting structures meets at least one of the following: a dimension of the locational accommodation space thereof in a first direction and a dimension of the corresponding locational protrusion in the first direction render a relative position between the optical film and the support completely fixed in the first direction, the dimension of the locational accommodation space in the first direction is greater than the dimension of the corresponding locational protrusion in the first direction, a dimension of the locational accommodation space in a second direction and a dimension of the corresponding locational protrusion in the second direction render the relative position between the optical film and the support completely fixed in the second direction, or, the dimension of the locational accommodation space in the second direction is greater than the dimension of the corresponding locational protrusion in the second direction;

wherein the second direction is perpendicular to the first direction; and wherein in a set of the at least two sets of locational fitting structures, a dimension of the locational accommodation space in the second direction is greater than a dimension of the corresponding locational protrusion in the second direction, and a distance between the locational protrusion and a first inner wall surface of the locational accommodation space is greater than a distance between the locational protrusion and a second inner wall surface of the locational accommodation space, and wherein a direction from the first inner wall surface to the second inner wall surface is parallel with the second direction, an edge of the optical film corresponding to a light bar is perpendicular to the second direction, and a distance between the first inner wall surface and the edge corresponding to the light bar is smaller than a distance between the second inner wall surface and the edge corresponding to the light bar.

2. The backlight source according to claim 1, wherein the at least two sets of locational fitting structures comprise a first set of locational fitting structures; and wherein a dimension of the locational accommodation space of the first set of locational fitting structures in the first direction and a dimension of the corresponding locational protrusion of the first set of locational fitting structures in the first direction render the relative position between the optical film and the support completely fixed in the first direction, and a dimension of the locational accommodation space of the first set of locational fitting structures in the second direction and a dimension of the corresponding locational protrusion of the first set of locational fitting structures in the second direction render the relative position between the optical film and the support completely fixed in the second direction.

3. The backlight source according to claim 2, wherein the first set of locational fitting structures is arranged in a marginal region near a middle position of the first edge of the optical film.

4. The backlight source according to claim 2, wherein the at least two sets of locational fitting structures comprise a second set of locational fitting structures; and wherein a dimension of the locational accommodation space of the second set of locational fitting structures in the first direction is greater than a dimension of the corresponding locational protrusion of the second set of locational fitting structures in the first direction, and a dimension of the locational accommodation space of the second set of locational fitting structures in the second direction is greater than a dimension of the corresponding locational protrusion of the second set of locational fitting structures in the second direction.

5. The backlight source according to claim 1, wherein the at least two sets of locational fitting structures comprise a second set of locational fitting structures; and wherein a dimension of the locational accommodation space of the second set of locational fitting structures in the first direction is greater than a dimension of the corresponding locational protrusion of the second set of locational fitting structures in the first direction, and a dimension of the locational accommodation space of the second set of locational fitting structures in the second direction is greater than a dimension of the corresponding locational protrusion of the second set of locational fitting structures in the second direction.

6. The backlight source according to claim 1, wherein the at least two sets of locational fitting structures further comprise: a third set of locational fitting structures and a fourth set of locational fitting structures;

wherein a dimension of the locational accommodation space of the third set of locational fitting structures in the first direction and a dimension of the corresponding locational protrusion of the third set of locational fitting structures in the first direction render the relative position between the optical film and the support completely fixed in the first direction, and a dimension of the locational accommodation space of the third set of locational fitting structures in the second direction is greater than a dimension of the corresponding locational protrusion of the third set of locational fitting structures in the second direction; and wherein a dimension of the locational accommodation space of the fourth set of locational fitting structures in the first direction is greater than a dimension of the corresponding locational protrusion of the fourth set of locational fitting structures in the first direction, and a dimension of the locational accommodation space of the fourth set of locational fitting structures in the second direction and a dimension of the corresponding locational protrusion of the fourth set of locational fitting structures in the second direction render the relative position between the optical film and the support completely fixed in the second direction.

7. The backlight source according to claim 6, wherein a quantity of the third set of locational fitting structures is at least two, and the at least two third sets of locational fitting structures are arranged near a first edge of the optical film along a length direction of the first edge, and wherein the first edge is perpendicular to the first direction.

8. The backlight source according to claim 7, wherein the fourth set of locational fitting structures is arranged near a second edge of the optical film, and wherein the second edge is arranged opposite to the first edge.

9. The backlight source according to claim 8, wherein the fourth set of locational fitting structures is arranged in a marginal region near a middle position of the second edge of the optical film.

10. The backlight source according to claim 1, wherein a set of the at least two sets of locational fitting structures is arranged near a second edge of the optical film, a dimension of the locational accommodation space thereof in the first direction is greater than a dimension of the corresponding locational protrusion in the first direction, and a distance between the locational protrusion and a third inner wall surface of the locational accommodation space is greater than a distance between the locational protrusion and a fourth inner wall surface wall of the locational accommodation space, and wherein a direction from the third inner wall surface to the fourth inner wall surface is parallel with the first direction, and a distance between the third inner wall surface and the second edge of the optical film is greater than a distance between the fourth inner wall surface and the second edge of the optical film.

11. The backlight source according to claim 1, wherein in a set of the at least two sets of locational fitting structures, a dimension of the locational accommodation space thereof in the second direction is greater than a dimension of the corresponding locational protrusion in the second direction, and the dimension of the locational accommodation space in the second direction is greater than or equal to $a+\Delta L$ and is smaller than or equal to $a+2\Delta L$, where a is the dimension of the locational protrusion in the second direction, and $\Delta L$ is the greater one of thermal expansion amounts of film portions of the optical film at two sides of the corresponding locational fitting structure in the second direction.

12. The backlight source according to claim 1, wherein in a set of the at least two sets of locational fitting structures, a dimension of the locational accommodation space thereof in the first direction is greater than a dimension of the corresponding locational protrusion in the first direction, and the dimension of the locational accommodation space in the first direction is greater than or equal to $b+\Delta K$ and is smaller than or equal to $b+2\Delta K$, where b is the dimension of the locational protrusion in the first direction, and $\Delta K$ is the greater one of thermal expansion amounts of film portions of the optical film at two sides of the corresponding locational fitting structure in the first direction.

13. The backlight source according to claim 1, wherein each set of the at least two sets of locational fitting structures comprises the locational accommodation space formed on the optical film, and the locational protrusion formed on the support.

14. The backlight source according to claim 1, wherein the support is a plastic frame.

15. A display module, comprising the backlight source according to claim 1.

16. A display device, comprising the display module according to claim 15.

17. The display module according to claim 15, wherein the at least two sets of locational fitting structures comprise a first set of locational fitting structures; and wherein a dimension of the locational accommodation space of the first set of locational fitting structures in the first direction and a dimension of the corresponding locational protrusion of the first set of locational fitting structures in the first direction render the relative position between the optical film and the support completely fixed in the first direction, and a dimension of the locational accommodation space of the first set of locational fitting structures in the second direction and a dimension of the corresponding locational protrusion of the first set of locational fitting structures in the second direction render the relative position between the optical film and the support completely fixed in the second direction.

18. The display module according to claim 15, wherein the at least two sets of locational fitting structures comprise a second set of locational fitting structures; and wherein a dimension of the locational accommodation space of the second set of locational fitting structures in the first direction is greater than a dimension of the corresponding locational protrusion of the second set of locational fitting structures in the first direction, and a dimension of the locational accommodation space of the second set of locational fitting structures in the second direction is greater than a dimension of the corresponding locational protrusion of the second set of locational fitting structures in the second direction.

19. A backlight source, comprising an optical film, a support, and at least two sets of locational fitting structures configured to locate the optical film on the support, wherein each set of the at least two sets of locational fitting structures comprises a locational accommodation space formed on one of the optical film and the support, and a locational protrusion formed on the other of the optical film and the support, and wherein the locational protrusion is inserted in the locational accommodation space;

wherein, a set of the at least two sets of locational fitting structures meets at least one of the following: a dimension of the locational accommodation space thereof in a first direction and a dimension of the corresponding locational protrusion in the first direction render a relative position between the optical film and the support completely fixed in the first direction, the dimension of the locational accommodation space in the first direction is greater than the dimension of the corresponding locational protrusion in the first direction, a dimension of the locational accommodation space in a second direction and a dimension of the corresponding locational protrusion in the second direction render the relative position between the optical film and the support completely fixed in the second direction, or, the dimension of the locational accommodation space in the second direction is greater than the dimension of the corresponding locational protrusion in the second direction; and wherein the second direction is perpendicular to the first direction, wherein a set of the at least two sets of locational fitting structures is arranged near a second edge of the optical film, a dimension of the locational accommodation space thereof in the first direction is greater than a dimension of the corresponding locational protrusion in the first direction, and a distance between the locational protrusion and a third inner wall surface of the locational accommodation space is greater than a distance between the locational protrusion and a fourth inner wall surface wall of the locational accommodation space, and wherein a direction from the third inner wall surface to the fourth inner wall surface is parallel with the first direction, and a distance between the third inner wall surface and the second edge of the optical film is greater than a distance between the fourth inner wall surface and the second edge of the optical film.

20. A backlight source, comprising an optical film, a support, and at least two sets of locational fitting structures configured to locate the optical film on the support, wherein each set of the at least two sets of locational fitting structures comprises a locational accommodation space formed on one of the optical film and the support, and a locational protrusion formed on the other of the optical film and the support, and wherein the locational protrusion is inserted in the locational accommodation space;

wherein, a set of the at least two sets of locational fitting structures meets at least one of the following: a dimension of the locational accommodation space thereof in a first direction and a dimension of the corresponding locational protrusion in the first direction render a relative position between the optical film and the support completely fixed in the first direction, the dimension of the locational accommodation space in the first direction is greater than the dimension of the corresponding locational protrusion in the first direction, a dimension of the locational accommodation space in a second direction and a dimension of the corresponding locational protrusion in the second direction render the relative position between the optical film and the support completely fixed in the second direction, or, the dimension of the locational accommodation space in the second direction is greater than the dimension of the corresponding locational protrusion in the second direction; and wherein the second direction is perpendicular to the first direction, wherein in a set of the at least two sets of locational fitting structures, a dimension of the locational accommodation space thereof in the second direction is greater than a dimension of the corresponding locational protrusion in the second direction, and the dimension of the locational accommodation space in the second direction is greater than or equal to $a+\Delta L$ and is smaller than or equal to $a+2\Delta L$, where a is the dimension of the locational protrusion in the second direction, and $\Delta L$ is the greater one of thermal expansion amounts of film portions of the optical film at two sides of the corresponding locational fitting structure in the second direction.

* * * * *